United States Patent Office 3,468,702
Patented Sept. 23, 1969

3,468,702
DIALKANOL AMIDE ANTI-STATIC COMPOSITION FOR POLYMERS
Major L. Gallaugher, Bartlesville, and James E. Pritchard, Washington County, Okla., assignors to Phillips Petroleum Company, a corporation of Delaware
No Drawing. Filed June 4, 1965, Ser. No. 461,536
The portion of the term of the patent subsequent to Dec. 14, 1982, has been disclaimed
Int. Cl. B44d 1/22; D06m 15/00
U.S. Cl. 117—138.8
3 Claims

ABSTRACT OF THE DISCLOSURE

Polymers such as polyarylene sulfide, polyvinyl aromatic, polyvinyl halide, polyvinylidene halide, polyacetal, polycarbonate, polyester, polyvinylester, and polyamide are surface treated with a dialkanol amide to reduce the tendency to accumulate an electrostatic charge.

---

This invention relates to a method for reducing the tendency of a surface of a solid polymer to accumulate an electrostatic charge and the article produced by that method.

Fibers, films, sheets and molded articles made from resinous polymers are subject to objectional properties resulting from the accumulation of electrostatic charges thereupon. One procedure heretofore disclosed for alleviation of this problem involves incorporation in the resin of certain additives, while another proposed procedure is the direct application of the antistatic materials to the surface of the fabricated article. Numerous problems have been encountered in these operations. Additives incorporated in the resin may undergo decomposition at temperatures employed in fabrication operations thereby rendering them inactive or decomposition products develop therefrom and lead to objectionable color or odor development. On the other hand, the so-called "wipe-on" antistatic materials heretofore used may be lost from the surface either by evaporation or oxidative changes or by mechanical abrasion effects encountered in handling, shipping, storage and the like. Furthermore, it has been found that materials successful in eliminating the accumulation of electrostatic charges for one type of resin may be much less effective for another type of resin. For example, antistatic materials which are highly satisfactory for low density polyethylene are frequently much less effective for high density polyethylene.

It has now been found that polymers selected from a group consisting of polyarylene sulfide, polyvinylaromatic, polyvinyl halide, polyvinylidene halide, polyacetal, polycarbonate, polyester, polyvinylester, polyamide, and mixtures thereof can be surface treated with a dialkanol amide to reduce the tendency of the surface of that polymer to accumulate an electrostatic charge and that there is produced an article having a reduced tendency to accumulate an electrostatic charge comprising at least one of the above polymers having at least a portion of its surface covered with the dialkanol amide.

Accordingly, it is an object of this invention to provide a new and improved method for reducing the tendency of the surface of a polymer to accumulate an electrostatic charge.

It is another object of this invention to provide a new and improved polymeric article having a reduced tendency to accumulate an electrostatic charge.

Other aspects, objects and the several advantages of this invention will be apparent to those skilled in the art from the description and the appended claims.

According to this invention a solid surface of at least one of the above polymers has applied thereto by any suitable method such as immersion, patting on, spraying on, wiping on, painting on, or any other conventional coating method, a dialkanol amide represented by the formula

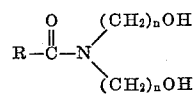

wherein:

R is an alkyl group containing from 6 to 16 carbon atoms and
$n$ is an integer from 2 to 4.

Although the amount of dialkanol amide coating employed can vary over wide operable ranges, generally those portions of the polymer that are coated will have from about $1 \times 10^{-5}$ to about $50 \times 10^{-5}$ gram of dialkanol amide per square centimeter of surface of the polymer. If the polymer is substantially completely coated with the dialkanol amide, then an amount of dialkanol amide sufficient to provide a continuous coating on the surface of the polymer will generally effect the reduced tendency to accumulate an electrostatic charge which is the surprising result of this invention. In general, the amount of dialkanol amide applied to the polymer will be that amount sufficient to reduce the electrostatic charge to a potential less than the maximum tolerable potential for the use to which the coated polymer is to be put. This maximum tolerable potential can also vary widely but will generally be in the range of 3 to 10 kilovolts, preferably 3 kilovolts, or that voltage which is generally sufficient under the particular circumstances to substantially eliminate dust or dirt particle pickup. However, it should be noted that this invention includes an application to the surface of the above polymers of an amount of dialkanol amide sufficient to substantially decrease the tendency of the polymer surface to accumulate electrostatic charges.

It has now been found that the surface of articles fabricated from the above polymers can be provided long term protection against the development of electrostatic charges thereon by the surface application of a long chain dialkanol amide, having the general formula hereinbefore set forth, dissolved in a volatile inert liquid. Typical of such dialkanol amide compounds are the diethanol amide of heptanoic acid, the diethanol amide of caprylic acid, diethanol amide of pelargonic acid, the diethanol amide of decanoic acid, the diethanol amide of lauric acid, the diethanol amide of pentadecanoic acid, the diethanol amide of heptadecanoic acid, the dipropanol amide of heptanoic acid, the dipropanol amide of pelargonic acid, the dipropanol amide of decanoic acid, the dipropanol amide of lauric acid, the dipropanol amide of pentadecanoic acid, the dipropanol amide of heptadecanoic acid, the dibutanol amide of heptanoic acid, the dibutanol amide of caprylic acid, the dibutanol amide of pelargonic acid, the dibutanol amide of decanoic acid, the dibutanol amide of lauric acid, the dibutanol amide of pentadecanoic acid and the dibutanol amide of heptadecanoic acid. These and other compounds can be made by any suitable method such as by the reaction of an alkanoyl chloride with the desired dialkanol amide. Presently preferred is the diethanol amide of lauric acid which can be prepared by reacting diethanol amine with lauroyl chloride.

Although the dialkanol amide can be applied to the surface of the polymeric articles to be treated in any conventional and suitable manner, one very suitable procedure is the dissolving of the dialkanol amide in a solvent inert to both the dialkanol amide and the polymer, such as an alcohol which boils at a temperature substantially lower than the temperature at which the dialkanol amide boils. Although the boiling temperature of the solvent can vary widely over a wide operable range depending upon the particular dialkanol amide employed, generally the solvents will boil in the range of about 100 to about 300° F. The solution of dialkanol amide is then applied to the polymeric surface of the article to be treated by any suitable means, such as with a soft cloth or an atomizing nozzle.

Although any volatile inert liquid having the above boiling point characteristics and which is a solvent for the dialkanol amide can be employed, particularly suitable materials include alcohols having from 1 to 5 carbon atoms per molecule including methanol, ethanol, propanol, isopropanol, butanol, isobutanol, pentanol, and the like. The amount of dialkanol amide dissolved in the solvent can vary widely depending upon the solvent's capabilities for dissolving the particular dialkanol amide. A generally suitable mixture comprises from 50 to 98 parts by weight of the solvent and from 2 to 50 parts by weight of the dialkanol amide based on the total composition weight.

The solvent evaporates quickly under normal ambient conditions and leaves a strongly adherent coating which will prevent accumulation of electrostatic charges on the article for many months. This is most surprising since most "rub-on" antistatic agents are readily removed by rubbing once or twice with a cloth or by other mechanical abrasion. In addition, this development is most surprising since it has been found that these long chain dialkanol amides are for most practical purposes incompatible with the polymers. The incorporation of the dialkanol amide directly into the polymer in a Banbury mixer, roller or extruder thus does not present a favorable avenue for the treatment of the polyolefins. Although the exact mechanism for this surprising development is unknown it would appear that the treating agent in some manner penetrates the surface of the resin or is adsorbed thereon.

Although the antistatic compositions of this invention are comprised substantially of the stated amides and a solvent therefor, the composition may also contain small amounts of other additives, such as antioxidants, ultraviolet stabilizers, and the like, provided the additional ingredients are not present in amounts sufficient to substantially alter the effectiveness of the composition for decreasing the tendency of the polymer to accumulate electrostatic charges.

The polyarylene sulfides of this invention are prepared by reacting at least one polyhalo-substituted aromatic compound with an alkali metal sulfide in a polar organic compound at an elevated temperature. Preferred polyhalo-substituted aromatic compounds are those containing one to three halogen atoms, inclusive, and having one to three fused or unfused benzene rings. A full and complete disclosure of these compounds and the methods of making same and polymers from same can be found in copending U.S. application Ser. No. 327,143, filed Nov. 27, 1963, now Patent 3,354,129 and of common assignee, hereby incorporated as to its disclosure herein by reference thereto. The materials employed in the above-referenced copending application, including the polar organic compounds disclosed in that application, can be employed in making the polymers applicable to the instant invention.

The polyvinylaromatics are prepared by polymerizing a vinylaromatic, preferably monovinylaromatic, in a conventional manner known to those skilled in the art such as heating the vinylaromatic in the presence of a benzoyl peroxide catalyst. Preferred vinylaromatics are those containing from 8 to 20, inclusive, carbon atoms per molecule, such as styrene and substituted styrenes.

The polyvinyl halides and polyvinylidene halides can also be prepared in the conventional manner known to those skilled in the art. For example, polyvinyl chloride and polyvinyl fluoride can be prepared by polymerizing the vinyl chloride or vinyl fluoride by heating same in the presence of a benzoyl peroxide catalyst. Preferred vinyl halides and vinylidene halides are those containing from 2 to 8, inclusive, carbon atoms per molecule, such as vinyl chloride, vinyl fluoride, vinylidene chloride, and the like.

When polyacetal is referred to herein it is meant to encompass the molecular structure of a linear acetal consisting of unbranched polyoxymethylene chains which are of great length, normally averaging more than 1000 $CH_2O$ units as represented by the formula

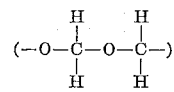

and of polyoxymethylene copolymers containing cyclic ethers. The polymers can be prepared, for example, by polymerizing trioxane or trioxane and 1,4-dioxane with a boron fluoride-organic compound coordinate complex in which oxygen or sulfur is the donor atom.

Polycarbonates as used herein are polymeric combinations of bifunctional phenols linked together through a carbonate linkage. These polymers are conventionally prepared by either ester exchange between a dialkyl carbonate and a dihydroxyaromatic compound or phosgenation of a dihydroxyaromatic. These polymers are preferably prepared from phenols having from 6 to 20, inclusive, carbon atoms per molecule. A suitable bis-phenol for making a polycarbonate is 2,2-bis(4-hydroxyphenyl) propane.

The polyesters formed involve the reaction between a carboxyl group of an organic acid and the hydroxyl group of a diol. Thus, aliphatic or aromatic dibasic acids react with aliphatic or aromatic base diols (glycols) to form polyesters, as is conventional and well known in the art. Preferred reactants are a dicarboxyaromatic acid having from 8 to 14, inclusive, carbon atoms per molecule and a dihydroxy alcohol having from 2 to 10, inclusive, carbon atoms per molecule.

The polymers of vinyl esters and the copolymers of those esters with 1-olefins can also be formed by conventional methods well known to those skilled in the art. For example, polyvinyl acetate is formed by polymerizing vinyl acetate or copolymerizing vinyl acetate and ethylene in the presence of peroxide catalyst. The vinyl ester employed preferably contains 3 to 12 carbon atoms, inclusive, per molecule.

The polyamides (nylons) are also formed in a conventional manner well known in the art which includes the condensation of a diamine with a dibasic acid; for example, hexamethylenediamine and adipic acid yields polyhexamethyleneadipamide. Other materials, such as hexamethylenediamine and sebacic acid and the like, are conventionally employed to produce polyamides. Preferred reactants are dibasic acids containing from 4 to 16, inclusive, carbon atoms per molecule and diamines containing from 4 to 16, inclusive, carbon atoms per molecule. Also, lactams containing from 5 to 16, inclusive, carbon atoms per molecule, such as caprolactam, can be employed to form polyamides.

The above polymers are commercially available and their use, characteristics, properties, methods of preparation and the like are set forth in various publications such as Modern Plastics magazine and the Modern Plastics Encyclopedia, both published by McGraw-Hill, Inc., as well as other plastics publications, such as The Chemistry of Commercial Plastics, Wakeman (Reinhold, New York, N.Y., 1947), and Manufacture of Plastics, Smith (Reinhold, New York, N.Y., 1964). These publications also disclose manufacturers and suppliers of the above polymers from which those polymers are commercially available.

EXAMPLE

A 3-inch by 6-inch by ⅛-inch slab of each polymer listed in the following table was treated by applying a 10 percent by weight solution of the diethanol amide of lauric acid in isopropyl alcohol to the surface strip to leave a residual coating of amide of about $10^{-4}$ gram per square centimeter. The effectiveless of the treatment was determined by rubbing the slab with a woolen cloth and testing with a Keithley Model 250 static meter fitted with a 2501 detecting head. Periodic tests over a period of 40 days give the following results:

TABLE

| Polymer | Static charge, kv., after indicated number of days | | | | | | | | | | | Static charge potential of the untreated polymer, kv. |
|---|---|---|---|---|---|---|---|---|---|---|---|---|
| | 0 | 1 | 2 | 4 | 5 | 7 | 10 | 14 | 19 | 20 | 40 | |
| Polyphenylene sulfide [1] | 0.0 | | 0.0 | 0.0 | | 0.0 | 0.0 | 0.0 | 0.0 | | | 14.0 |
| Polystyrene | 0.0 | | 0.0 | 0.0 | | 0.0 | 0.0 | 0.0 | 0.0 | | 0.0 | 30.0 |
| Polyvinyl chloride | 0.0 | | 0.0 | 0.0 | | 0.0 | 0.0 | 0.0 | 0.0 | | 0.0 | 10.0 |
| Polyacetal, Delrin [2] | 0.0 | 0.25 | | | 0.1 | | 0.1 | | | 0.0 | 0.1 | 20.0 |
| Polycarbonate, Lexan [3] | 0.0 | 0.1 | | | 1.0 | | 0.0 | | | 0.0 | 0.0 | 7.0 |
| Polyester, Mylar [4] | 0.0 | 0.0 | | | 0.0 | | 0.0 | | | 0.0 | 0.1 | 7.0 |
| Polyvinyl acetate, Elvax 250 [5] | 0.0 | 0.0 | | | 0.0 | | 0.0 | | | 0.0 | 0.0 | 12.0 |
| Polyvinyl fluoride | 0.0 | 0.0 | | | 0.0 | | 0.0 | | | 0.0 | 0.0 | 14.0 |
| Polyamide, Nylon 6/6 [6] | 0.0 | 0.0 | | | 0.0 | | 0.0 | | | 0.0 | 0.0 | 17.0 |

[1] Prepared by reacting p-dichlorobenzene with sodium sulfide in N-methylpyrrolidone by heating the mixture in a stainless steel autoclave for about 17 hours at about 481° F.
[2] Trademark of Du Pont for acetal resin.
[3] Trademark of General Electric for polycarbonate resin.
[4] Trademark of Du Pont for polyester resin.
[5] Trademark of Du Pont for an ethylene-vinyl acetate copolymer.
[6] Formed by condensation of hexamethylene diamine and adipic acid.

The data show that extremely low static charges, if any, were generated by the polymers treated in accordance with this invention for at least 40 days. In all cases during the 40-day test period the static charges accumulated, if any, remained far below the 3 kilovolt level at which dust and dirt particle attraction generally began.

During the period of observation and testing the polymers were stored on an open shelf and were repeatedly handled and rubbed with a cloth, thereby demonstrating the stability of the antistatic treatment of this invention against both oxidation, deterioration and mechanical removal or variation due to handling.

Reasonable variations and modifications are possible within the scope of this disclosure without departing from the spirit and scope of the invention.

We claim:
1. An article of manufacture having surface static charges of less than three kilovolts comprising a solid polymer selected from the group consisting of polyarylene sulfide, polyvinylaromatic, polyvinyl halide, polyvinylidene halide, polyacetal, polycarbonate, polyvinyl ester and mixtures thereof having at least a portion of its surface coated with an antistatic material consisting essentially of a dialkanol amide in an amount sufficient to substantially decrease the tendency of said polymer surface to accumulate electrostatic charges, said dialkanol amide having the formula represented by

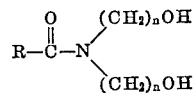

wherein:

R is an alkyl group containing from 6 to 16 carbon atoms and $n$ is an integer from 2 to 4.

2. The article according to claim 1 wherein said alkanol amide where present on said surface is present in an amount of from about $1 \times 10^{-5}$ to about $50 \times 10^{-5}$ gram per square centimeter per surface of the polymer.

3. The article according to claim 1 wherein said polymer is selected from the group consisting of polyphenylene sulfide, polystyrene, polyvinyl chloride, polyvinyl fluoride, polyvinyl acetate, and mixtures thereof.

References Cited

UNITED STATES PATENTS 3,161,594  12/1964  White et al. _____ 252—8.8
3,223,545  12/1965  Gallaugher et al. ____ 252—8.8 X WILLIAM D. MARTIN, Primary Examiner J. E. MILLER, Asisstant Examiner U.S. Cl. X.R.

117—139.5; 252—8.8